United States Patent [19]
Proudlove

[11] 3,726,337
[45] Apr. 10, 1973

[54] NUCLEAR REACTORS

[75] Inventor: Michael Joseph Proudlove, Knutsford, England

[73] Assignee: The Nuclear Power Group Limited, Knutsford, England

[22] Filed: Feb. 25, 1970

[21] Appl. No.: 13,893

[30] Foreign Application Priority Data

Feb. 27, 1969 Great Britain..................10,604/69

[52] U.S. Cl....................................165/47, 165/134
[51] Int. Cl.................................................F24h 3/00
[58] Field of Search...................165/47, 74, 76, 134

[56] References Cited
UNITED STATES PATENTS 3,305,002    2/1967    Leonard et al. ...................165/74
3,548,925    12/1970    Weber, Jr. ........................165/74

Primary Examiner—Charles Sukalo
Attorney—Holman & Stern

[57] ABSTRACT

A nuclear reactor pressure vessel comprising a concrete vessel wall, stressing tendons passing through said concrete wall and thereby pre-stressing said concrete, pods provided in said wall for accommodating heat exchanger tube banks, each pod extending to the outer surface of the wall, and a closure member closing each of said pods, each of said closure members being held in position by means of some of said stressing tendons.

5 Claims, 2 Drawing Figures

INVENTOR
MICHAEL JOSEPH PROUDLOVE

NUCLEAR REACTORS

This invention relates to nuclear reactors.

In gas-cooled, graphite moderate reactors it is common practice to house the graphite core in a pre-stressed concrete pressure vessel, the pre-stressing of the concrete being achieved by stressing tendons passing through the concrete. Heat exchangers for transferring heat from a coolant gas circulated through the reactor core to a working medium, such as water to raise steam, can be located in bores or so-called 'pods' within the wall of the vessel. The heat exchangers comprise banks of tubes supported within the pods and the pods lie within the cooling gas circuit. To facilitate access to the tube banks it is also known to house the tubes in pods which open into the outer surface of the vessel, the pods being sealed during operation of the reactor by closure members.

Such closure members must be capable of withstanding the reactor gas pressure and one form of member has a bayonet-type fitting to prevent the ejection of the closure member under the operating gas pressure. Such a fitting requires rotation of the member to effect release. In another arrangement the closure members are held down by bolts.

Both kinds of fitting result in some degree of complication especially when high gas pressures are used. On the one hand the need to rotate the closure member to effect release can lead to difficulty whilst on the other hand the need to use bolts of large diameter can also lead to difficulty in guaranteeing the required stress levels due to non-homogeneity of the bolt materials.

According to the present invention the closure members are held in position by some of the stressing tendons used to pre-stress the concrete vessel.

In one embodiment the closure member is in the form of a cylindrical member with one end closed and the other end having a flange which rests on a seating at the outer end of the pod, stressing tendons passing through the vessel and disposed around the pod being arranged to pass through openings in the flange of the closure member and having tendon tensioning devices adapted to act against the flange to hold the closure member in position.

One embodiment of the invention will now be described by way of example with reference to the accompanying drawings in which.

Figure 2:
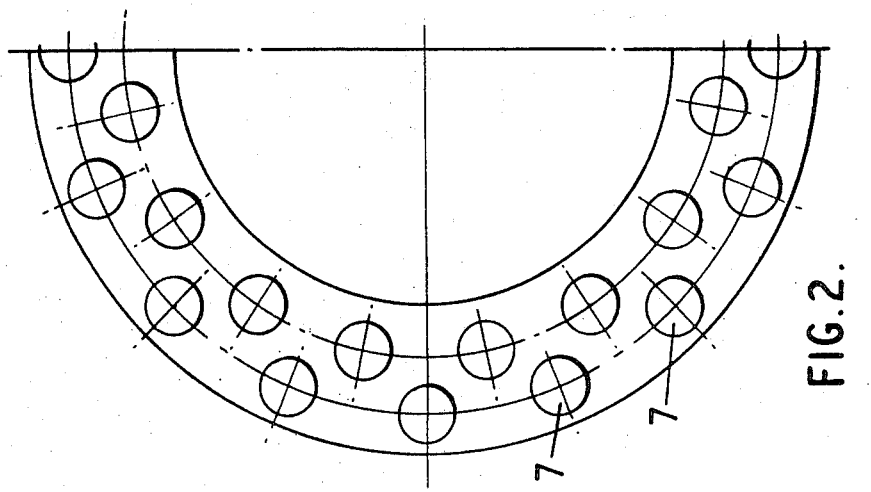
FIG. 2 is a half plan of FIG. 1.
Figure 1:
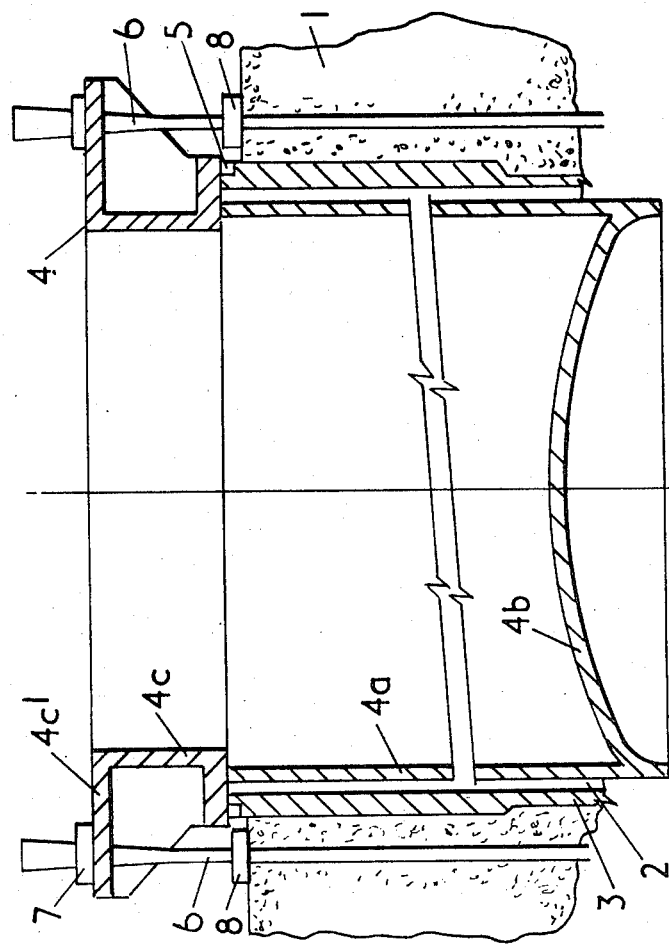
FIG. 1 is a section through the outer end of a pod for housing a heat exchanger in the wall of a pre-stressed concrete vessel for a nuclear reactor.

In carrying the invention into effect in the form illustrated and referring to FIGS. 1 and 2, the wall 1 of a pre-stressed concrete vessel housing a nuclear reactor, not shown, has an opening or 'pod' formed therein for housing a tubular heat exchanger in a known manner. The tube banks forming the heat exchanger are not shown as their location within the pod forms no part of the present invention.

The pod has a metal liner 3, for example, of mild steel, and, located in the outer end of the pod, is a closure member 4 comprising a cylindrical part 4a, having a closed end 4b which may contain penetrations carrying, for example, steam and feed water to the boiler units and an outer flanged portion 4c which rests on the liner 3 and supports the cylindrical part within the pod. A double sealing gasket 5 is located between the flanged portion and the outer end of the liner as shown.

Steel stressing tendons 6 pass through the wall of the vessel and, as can be seen in FIG. 2, are disposed around the pod. The tendons lie on concentric rings in staggered relation as shown to give a compact arrangement.

The flanged portion 4c has an outer flange 4c' which carries the anchorages 7 for the tendons. The tendons which terminate above the anchorages extend down through the vessel wall to suitable anchor points lower down the vessel.

In operation the closure member is inserted in the outer end of the pod with the flanged portion resting on the liner 3. The tendons which are threaded through the flange 4c' are tensioned by conventional apparatus. To release and remove the closure member a collar 8 is adapted to take the tendon weight and the anchorages 7 are then released. When all the anchorages are removed the closure member may be lifted vertically off the protruding ends of the tendons. To replace the closure member the individual tendons are re-inserted through flange 4c' using temporary guide tubes which terminate below flange 4c'. These tubes position the tendons as the closure member is lowered on to its seating.

With the arrangement described no rotation of heavy components is required to release the closure member and the use of large numbers of large diameter bolts is avoided.

I claim:

1. In a nuclear reactor pressure vessel defined by a concrete wall having stressing tendons to pre-stress the concrete, and bores accommodating heat-exchanger tube banks, each of said bores being closed by a closure member, the improvement comprising means provided upon each of said closure members and engaging some of said stressing tendons whereby each closure member is held in position.

2. A nuclear reactor pressure vessel comprising a concrete vessel wall, stressing tendons passing through said concrete wall thereby pre-stressing said concrete, pods provided in said wall and accommodating heat-exchanger tube banks, each pod extending to the outer surface of the wall, and a closure member closing each of said pods, each of said closure members being held in position by means of some of said stressing tendons.

3. A nuclear reactor pressure vessel according to claim 2, wherein the closure member is in the form of a closed tubular member having a flange through which pass the stressing tendons.

4. A nuclear reactor pressure vessel according to claim 2, wherein the closure member is in the form of a cylindrical member with one end closed and the other end having a flange which rests upon a seating at the outer end of the pod, stressing tendons passing through the vessel and disposed around the pod being arranged to pass through openings in the flange of the closure member and having tendon tensioning devices adapted to act against the flange to hold the closure member in position.

5. A nuclear reactor pressure vessel according to claim 3, wherein the tendons lie on concentric rings.

* * * * *